(12) United States Patent
Eckhardt

(10) Patent No.: US 6,964,284 B2
(45) Date of Patent: Nov. 15, 2005

(54) SEALING SYSTEM

(75) Inventor: Arnold Eckhardt, Ranstadt (DE)

(73) Assignee: The Goodyear Tire & Rubber Company, Akron, OH (US)

( * ) Notice: Subject to any disclaimer, the term of this patent is extended or adjusted under 35 U.S.C. 154(b) by 505 days.

(21) Appl. No.: 10/241,261

(22) Filed: Sep. 11, 2002

(65) Prior Publication Data
US 2003/0047652 A1 Mar. 13, 2003

(30) Foreign Application Priority Data
Sep. 11, 2001 (DE) .................................. 201 15 003 U

(51) Int. Cl.⁷ ................................................ B65B 1/04
(52) U.S. Cl. ............................ 141/38; 141/9; 141/100; 152/415
(58) Field of Search ............................ 141/9, 38, 100, 141/67; 152/415, 154.1; 156/75; 222/630, 637

(56) References Cited

U.S. PATENT DOCUMENTS

| | | | |
|---|---|---|---|
| 6,283,172 B1 | 9/2001 | Thurner | 141/38 |
| 6,454,892 B1 | 9/2002 | Gerresheim et al. | 156/115 |
| 6,766,834 B1 * | 7/2004 | Eckhardt | 141/38 |
| 6,789,581 B2 * | 9/2004 | Cowan et al. | 141/38 |

FOREIGN PATENT DOCUMENTS

| | | | | |
|---|---|---|---|---|
| DE | 198 46 451 A 1 | 10/1998 | | B29C/73/02 |
| EP | 0 753 420 A | 4/2000 | | B60C/17/00 |

* cited by examiner

Primary Examiner—Steven O. Douglas
(74) Attorney, Agent, or Firm—Richard B. O'Planick

(57) ABSTRACT

A system for the sealing of inflatable articles, in particular tires, has at least one container containing a sealant. This container has a gas inlet and an outlet which can be coupled to an article to be sealed. A source of gas pressure, in particular an electrically drivable compressor, is connectable to the gas inlet of the container and at least partly accommodated in a housing. The housing of the gas pressure source has at least one coupling section at which the container can be coupled mechanically to the housing, in particular coupled in form-matched and/or force transmitting manner, to establish a state of use in such a way that the housing of the gas pressure source standing on the ground serves as a pedestal for the container, which is oriented in accordance with its intended purpose.

24 Claims, 3 Drawing Sheets

Figure 1A:
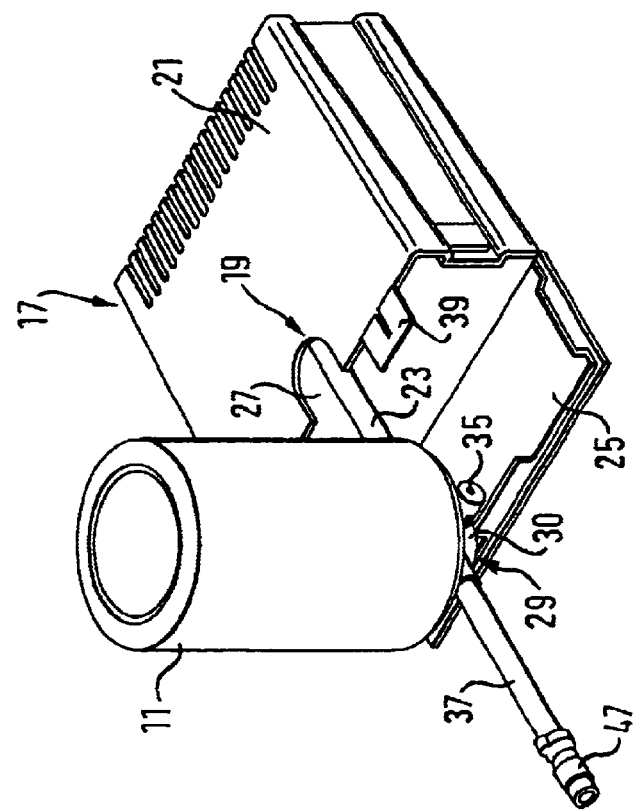

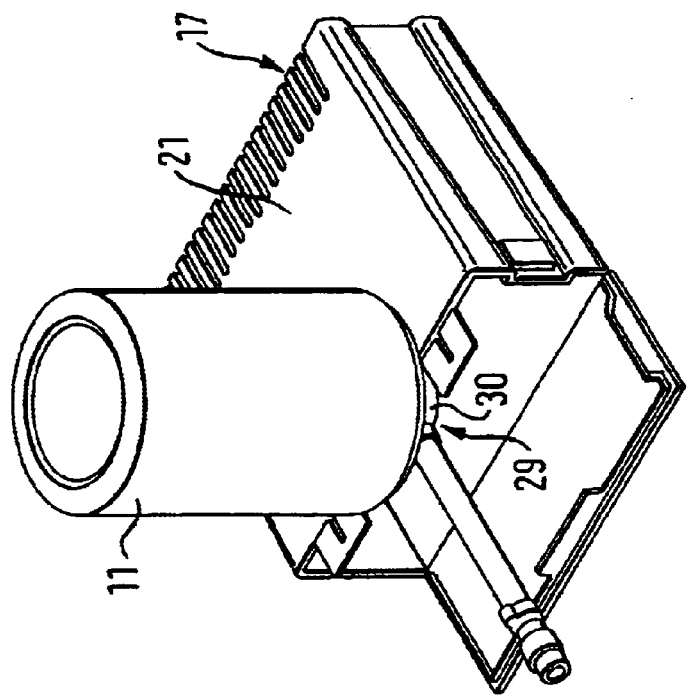
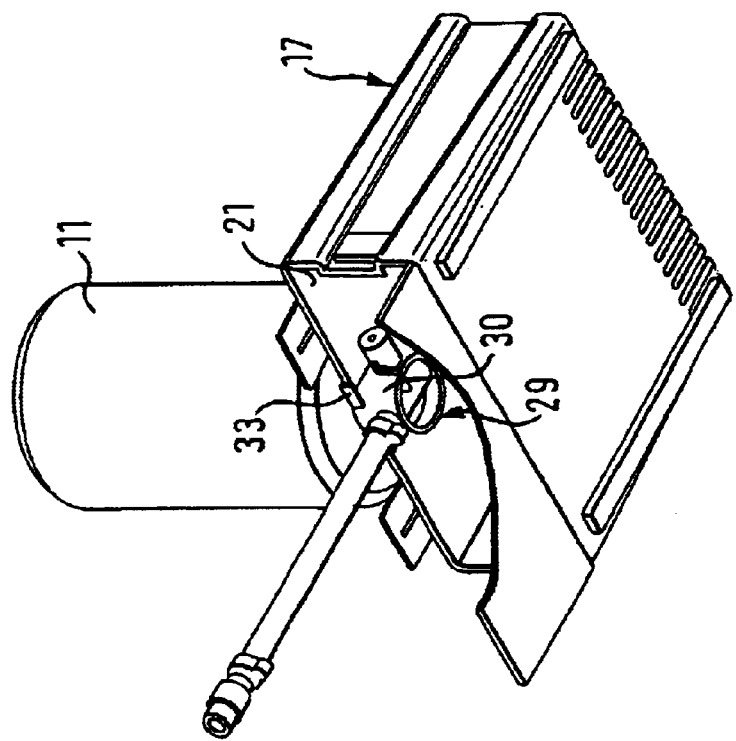

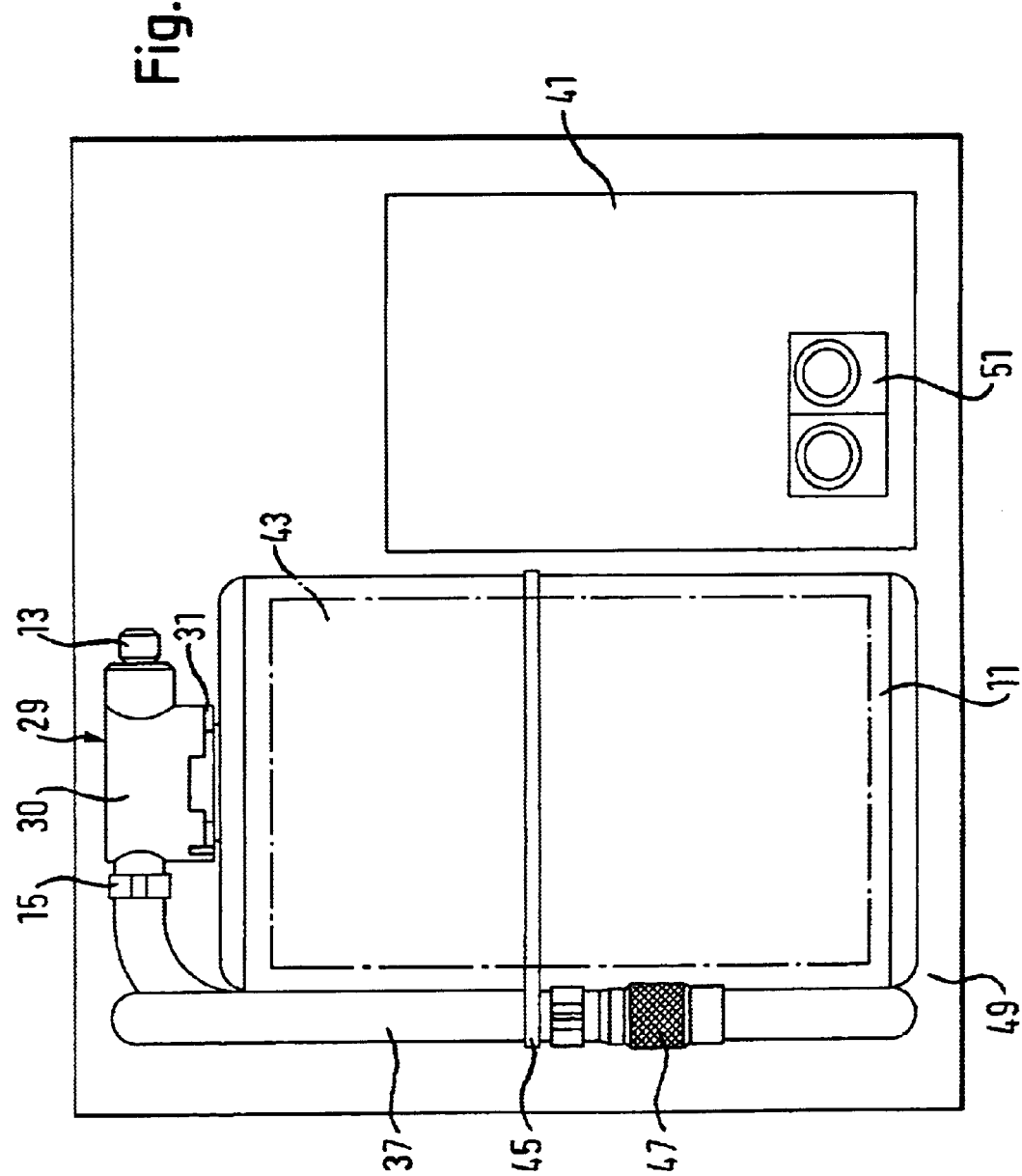

SEALING SYSTEM

The invention relates to a system for the sealing of inflatable articles having at least one container containing a sealant and having a gas inlet and an outlet which can be coupled to an article to be sealed as well as a source of gas pressure connectable to the gas inlet of the container.

A sealing apparatus is, for example, known from DE 198 46 451 A1. This apparatus serves to seal a leak in a punctured tire or a tire otherwise damaged when driving, in that a special sealant is introduced via the tire valve into the tire and the tire is subsequently pumped up at least to a pressure at which it can be driven.

The object of the invention is to provide a sealing system of the initially named kind which is as favorably priced as possible, is simply constructed and is easy to handle, while having a reliable manner of operation.

This object is satisfied by the features of claim 1, in particular in that the gas pressure source is accommodated at least partly in a housing and the housing has at least one coupling section at which the container can be coupled mechanically to the housing to establish a state of use in such a way that the housing of the gas pressure source standing on the ground serves as a pedestal for the container which is oriented in accordance with its intended purpose.

In accordance with the invention the housing, which preferably consists of plastic, satisfies an advantageous double function in that it serves, on the one hand, for the accommodation of the gas pressure source and, on the other hand, has a standing aid for the container to which the container can be coupled when oriented in the manner intended, which enables an orderly sealing of the respective inflatable article. The gas pressure source is preferably a commercial apparatus with housing. This gas pressure source obtainable commercially, or its housing, now only needs to be provided with a coupling section for the container in order to be able to serve as a pedestal for the container. In this manner, a commercially available, electrically driven compressor can, for example, be used in accordance with the invention also as a standing aid for the container containing the sealant. In accordance with the invention additional measures are not necessary in order to ensure safe standing of the container.

The container preferably includes a tank section which contains the sealant and which must stand at least approximately upright in order to ensure an orderly sealing operation. The tank section preferably has a cylindrical or flask-like shape. Using the sealing system of the invention, the standing surface of the container can be enlarged, or indeed first provided, by means of the housing of the gas pressure source in advantageous manner, so that the container stands reliably upright during the sealing operation.

The invention has proved to be particularly advantageous in combination with containers which are formed so that they are not able to stand on their own at their side facing the ground in the state of use. This is, for example, the case with containers in which the gas inlet and the outlet are formed in a removable unit which is attached, in particular releasably attached, to one of the end faces of the respective container or tank section, and is preferably screwed to the container or tank section. Independently of the design of the removable unit and its ability to serve as a more or less reliable standing surface for the container, the use, in accordance with the invention, of the gas pressure source or of the housing of the gas pressure source serves to ensure that the container is orientated in an orderly manner in use and stands reliably.

In the case of a container provided with a removable unit, provision is preferably made in accordance with the invention that the container can be coupled via the removal unit to the housing of the gas pressure source. The side of the removal unit remote from the container can in this connection be formed as an additional standing surface. In this way it is possible to temporarily set aside the container, in order, for example, to connect the container or the removal unit to the gas pressure source, before the container is coupled to the housing of the gas pressure source which serves as a pedestal in order to start the sealing process.

In accordance with the invention it is in principle also possible for the housing to simply represent an additional standing aid in the coupled state and for the container itself also to be supported on the ground, for example via a removal unit.

However, provision is preferably made in accordance with the invention for the container to be supported in the state of use on the ground exclusively via the housing. In this way the reliability with which the container stands is ensured exclusively by the housing and thus independently of the design of the container of an optionally provided removal unit of the container.

The system of the invention can basically be used for the sealing of any desired inflatable articles. A preferred application of the system of the invention relates to the sealing of vehicle tires. In this connection the sealing system in accordance with the invention is preferably formed as a transportable repair set which can be carried without problem, for example in the trunk of a vehicle. In the event of a puncture, it is only necessary for the container to be coupled to the housing of the gas pressure source, with the connection of the container to the gas pressure source taking place either before or after the coupling process, if a permanent connection between the container and the gas pressure source is not provided.

The term "ground" in the sense of the invention means basically any preferably at least substantially flat surface on which the housing of the gas pressure source can be laid or placed so that the container has an orientation in accordance with its purpose in the state coupled to the housing, such that an orderly sealing operation is ensured. The gas pressure source is preferably designed as an electrically operatable compressor. In the case of a sealing system in accordance with the invention which is designed to be carried in motor vehicles, provision is preferably made for the compressor to be connectable to a power socket of the vehicle.

The housing preferably has at least one flat standing surface, the housing is preferably of approximately parallelepiped shape.

The coupling section is preferably so designed that the container can be coupled in form-fitted and/or force-transmitting manner to the housing.

In a particularly preferred practical embodiment of the invention, provision is made for the container to be able to be pushed onto the housing and/or plugged onto the housing. A particularly simple coupling of the container to the housing is achieved, in accordance with a preferred embodiment, when only a single relative movement is required between the container and the housing for this coupling which takes place in one go. This is preferably a linear relative movement.

Furthermore, the coupling between the container and the housing is preferably designed such that the container is prevented from movement relative to the housing in directions differing from the coupling direction in the state coupled to the housing. In this way, the container can indeed be released from the housing again opposite to the coupling direction, but cannot otherwise be moved relative to the housing. An unintended release of the connection between the container and the housing is hereby counteracted in advantageous manner.

The coupling section is preferably formed at a region of the housing spaced from the ground in the state of use. The coupling section can be formed at a side of the housing which extends parallel to the standing surface of the housing. In this manner it can be ensured that, even in the state coupled to the housing, the lower side of the container, and in particular a removal unit of the container which confronts the ground in use, is, on the one hand, not contaminated when the ground is not clean and is, on the other hand, accessible without problem.

A connection region of the container which includes the gas inlet is preferably arranged in the state coupled to the housing in the region of a housing opening, and indeed preferably in such a way that the gas inlet confronts the interior of the housing. In this way a short and simple connection can be realized between the container and the gas pressure source in advantageous manner.

Furthermore, provision is preferably made for the coupling section to be formed at a marginal zone at one side of the housing which bounds a housing opening which is at least present in the state of use. The housing opening can be an open side of the housing which is preferably closed when not in use. The housing opening serves, in particular, to connect the container to the gas pressure source accommodated in the housing. A connection line can serve for this purpose which, when not in use, is accommodated together with the gas pressure source in the housing and is preferably permanently connected to the gas pressure source.

A closure flap can be provided with which the housing opening can be closed. The coupling section for the container is preferably formed at one side of the housing which lies opposite to the side of the housing at which the closure flap is hinged.

In a particularly preferred practical embodiment of the invention the coupling section has at least one cut-out which is formed in one of the housing sides and can be brought into engagement with a coupling region of the container. A coupling section of this kind can be produced in a particularly simple manner if simply the cut-out is formed in the relevant side of the housing, which can, for example, takes place simply by cutting it out or breaking it out.

In particular, it is hereby possible to provide a commercially available compressor, or the housing of a commercially available compressor with the coupling cut-out for the container, which is possible with a minimum of effort work-wise and time-wise. This processing of a commercially available compressor, which requires only a minimal effort and is extremely advantageous from the point of view of its effect, also endows the housing with a completely new additional function with a maximum useful effect for a minimum of effort.

It is particularly preferred when the cut-out includes a recess in a margin of one of the housing sides. A cut-out of this kind can be made particularly simply and, at the same time, the regions bounding the margin can offer a reliable support for the container.

It is particularly preferred when the container and in particular its removal unit is provided with guide and/or holding means which cooperate with the coupling section. The guide and/or holding means are preferably provided in the form of slits or grooves which cooperate with the marginal regions which bound the housing cut-out for the container.

The guide and/or holding means are preferably formed at diametrically oppositely disposed sides of a cylindrical section of a container, in particular of a removal unit of the container.

Furthermore, provision is preferably made for the container, in particular a removal unit of the container, to be provided with stops by which the desired position of the container coupled to the housing is fixed. A defined relative position between the container and the housing is ensured in this manner during the sealing operation.

The stops are preferably formed as push-on or plug-on limits for the container.

Further preferred embodiments of the invention are also set forth in the subordinate claims, in the description and in the drawing.

Figure 1B:
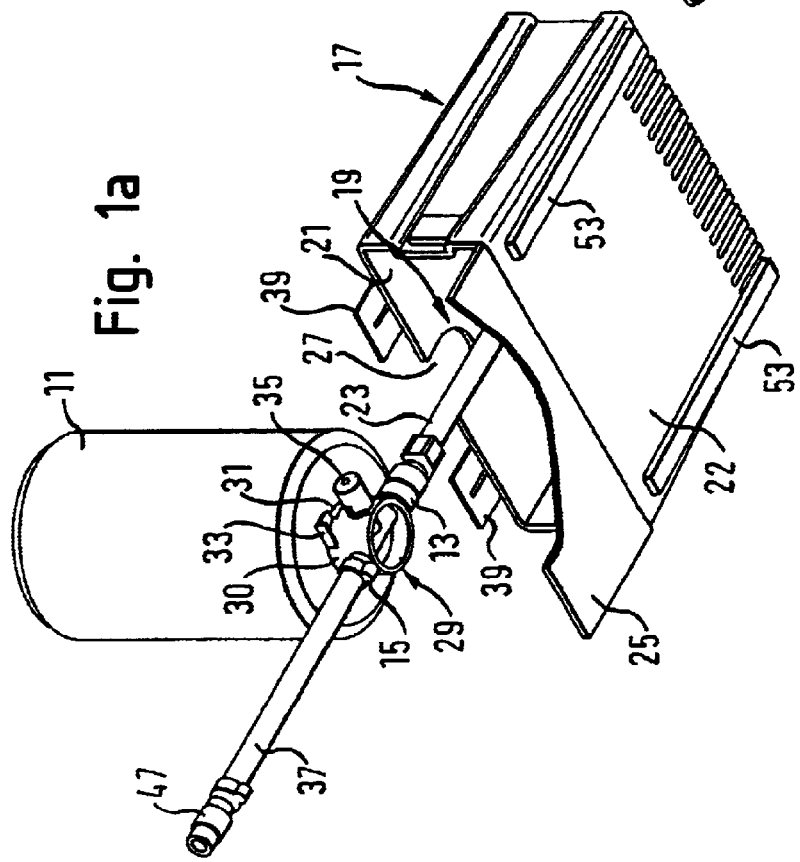

The invention will be explained in the following by way of example and with reference to the drawing in which are shown:

FIGS. 1a and 1b perspective views of a sealing system in accordance with the invention in a state prior to use, FIGS. 2a and 2b views corresponding to FIGS. 1a and 1b with a container coupled to the housing, and FIG. 3 a container of a sealing system in accordance with the invention in a storage state.

FIGS. 1a and 1b show an embodiment of a system in accordance with the invention which serves as a repair set which can be carried in a vehicle for the sealing of damaged vehicle tires. The system includes a container 11, the cylindrical tank section of which is filled with a special sealant and which carries at its lower end a removal unit 29 which is releasably screwed to the lower side of the container. The removal unit 29 has a gas inlet 13 by which the removal unit 29 can be connected via a line 23 to a compressor serving as a gas pressure source which will be described in more detail in other parts of the description. An outlet 15 of the removal unit 29 is connected to a filling hose 37 by which the container can be connected to a vehicle tire to be sealed. The connection to the tire valve takes place via a coupling 47.

The manner of operation of the container 11 and of the removal unit 29, which is described in detail in the German patent application DE 19846451 A1, will not be described in more detail in the following. The basic principle consists of introducing a gas, in particular air, by means of a compressor via the inlet 13 into the container 11 and thereby forcing the sealant via the outlet 15 into the tire to be sealed.

The compressor, which is not shown in the drawings, is accommodated in a housing 17 of box-like or parallelepiped shape which can be opened at one side. For this purpose a closure flap 25 is provided which can be hinged to a lower side 22 of the housing serving as the standing surface and can be latched in the closed state by means of two latching lugs 39 which are pivotably mounted to the opposite side of the housing 21 via film hinges.

When the flap 25 is opened, a hose 23, permanently connected to the compressor, can be connected to the gas inlet 13 of the container 11 and in this manner the container 11 connected to the gas pressure source. The length of the gas connection line 23 is dimensioned such that the establishment of the connection between the line 23 and the gas inlet 13 can take place when the container 11 is spaced from the open side of the housing in order to enable comfortable attachment of the container 11.

A coupling section 19 of the housing 17 to which the container 11 can be coupled via the removal unit 29 to the housing 17 is formed by a cut-out 27 in the upper side 21 of the housing and also by the marginal regions of this housing side 21 which bound the cut-out 27. The width of the cut-out 27 is smaller than the diameter of the cylindrical section 30 of the removal unit 29 of the container 11. The end region of the cut-out 27 is formed as an approximately U-shaped recess, is set back from the straight edge of the upper side 21 of the housing bounding the open housing side and is rounded in accordance with the curvature of the cylindrical cross-section 30 of the removal unit 29.

Adjacent to the lower end face of the container 11 or its tank section, the cylindrical section 30 of the removal unit 29 is provided at diametrically oppositely disposed sides with grooves 31 extending parallel to the end face into which the straight sections of the cut-out 27 in the marginal regions bounding the opening in the housing side 21 engage when the container 11 is pushed onto the housing side 21.

In the pushed-on state, which is shown in FIGS. 2a and 2b, only a movement of the container 11 opposite to the push-on direction relative to the housing 17 is possible, as a result of this form-matched and force-transmitting coupling of the container 11 to the upper side of the housing 21 in order to be able to remove the container 11 from the housing again. This connection between the housing 21 and the container 11 via the marginal regions which laterally bound the cut-out 27 and into which the grooves 31 serving as a guide and/or holding means engage prevents relative movements with a component perpendicular to the upper side 21 of the housing and thus movements of the container 11 perpendicular to its longitudinal axis.

Stops 33 for the edge of the upper side 21 of the housing which are formed as angled pieces and secured to the removal unit 29 define the desired position of the container 11 in the state coupled to the housing 11.

A use of the container 11 in accordance with its purpose assumes that it stands at least substantially vertically, i.e. that the longitudinal axis of the container 11 extends at least substantially vertically, and the container 11 is arranged with the removal unit 29 facing the ground and to this extent stands on its head. The design of the upper housing side 21 in accordance with the invention as a fixing device for the container 11 ensures a defined and stable relative orientation between the housing 17 and the container 11 such that the longitudinal axis of the container 11 extends perpendicular to the upper side 21 of the housing and thus perpendicular to the lower side 22 of the housing 17 which extends parallel to it. Thus, when the lower side 22 of the housing 17 or of contact strips 53 applied to the lower side 22 is/are laid or placed on a planar surface an orderly sealing operation is ensured with the container 11 standing upright. In accordance with the invention the housing 17 of the compressor thus acts as a standing aid or a standing pedestal for the container 11 which ensures an orderly orientation of the container 11 during the sealing operation. The housing 17 hereby satisfies in advantageous manner a double function as a compressor housing, on the one hand, and as a container base or container pedestal with a secure fixing possibility for the container, on the other hand.

The unit consisting of a compressor and the housing 17 is freely obtainable in commerce. Consequently, it only needs to be modified by forming the cut-out 27 in the upper side 21 of the housing in order for it to be used to receive and fix the container 11, whereupon the housing 17 can be used as a pedestal for the container 11. In this way, in a conceptually simple and favorably priced way and means, components which are in any event present are advantageously used for an additional function which would otherwise only be satisfied with the aid of additional components, which would disadvantageously increase the costs, the space requirement and the weight of the sealing system.

In order to establish the state of use, the user only needs to open the closure flap 25, to connect the removal unit 29 to the gas hose 23 and to plug the container 11 onto the upper housing side 21. A reliable standing position of the container 11 is ensured on a at least approximately planar surface by the housing 17 even when top heavy due to a high state of filling in the tank section. The compressor is actuated by connecting it to an onboard power socket of the motor vehicle, such as the cigarette lighter socket, and actuating a switch.

In an alternative embodiment of the invention provision can basically be made for the housing 17 to not only contains the compressor but rather also to serve for the storage of the container 11 and of the filling hose 37. In this manner, a compact unit can be provided which makes it possible to transport together and to store all the components of the sealing system of the invention when not in use. The container 11 can already be connected to the compressor during the manufacture or assembly of this system.

In a preferred variant of the invention, the container 11 is, however, stored separately from the compressor and indeed in a bag 49 which preferably consists of PE, as shown in FIG. 3. The hose 37 which serves for the connection to the vehicle tire is held by means of a rubber ring 45 on the container 11 provided with the label 43. The bag also contains an operating instruction 41 which is provided with adhesive labels which point out the maximum permitted speed of a tire sealed with a system in accordance with the invention.

Reference Numeral List

| | |
|---|---|
| 11 | container |
| 13 | gas inlet |
| 15 | outlet |
| 17 | housing |
| 19 | coupling section |
| 21 | housing side |
| 22 | housing side |
| 23 | line, gas hose |
| 25 | closure flap |
| 27 | cut-out |
| 29 | removal unit |
| 30 | cylindrical section |
| 31 | guide and/or holding means |
| 33 | stop |
| 35 | pressure release valve |
| 37 | filling hose |
| 39 | latching lug |
| 41 | operating instructions |
| 43 | label |
| 45 | rubber ring |
| 47 | coupling |
| 49 | bag |
| 51 | label |
| 53 | contact strips |

What is claimed is:

1. A system for the sealing of inflatable articles, in particular tires, having at least one container (11) containing a sealant and having a gas inlet (13) and an outlet (15) which can be coupled to an article to be sealed, a source of gas pressure connectable to the gas inlet (13) of the container (11) and at least partly accommodated in a housing (17), in particular an electrically drivable compressor, with the housing (17) of the gas pressure source having at least one coupling section (19) at which the container (11) can be coupled mechanically to the housing (17), in particular coupled in form-locked and/or force transmitting manner, to establish a state of use in such a way that the housing (17)

of the gas pressure source standing on the ground serves as a pedestal for the container (11) which is oriented in accordance with its intended purpose.

2. A system in accordance with claim 1, characterized in that the container is supported on the ground in the state of use exclusively via the housing (17).

3. A system in accordance with claim 1, characterized in that the housing (17) has at least one flat standing surface.

4. A system in accordance with claim 1, characterized in that the housing (17) is approximately of parallelepiped shape.

5. A system in accordance with claim 1, characterized in that the container (11) sits on the housing (17) in the state coupled to the housing (17).

6. A system in accordance with claim 1, characterized in that the container (11) can be pushed onto the housing (17) and/or plugged onto it.

7. A system in accordance with claim 1, characterized in that only a single relative movement between the container (11) and the housing (17), in particular a linear relative movement is required for the coupling of the container (11) to the housing (17) which takes place in one go.

8. A system in accordance with claim 1, characterized in that the container (11) is hindered in the state coupled to the housing (17) from movements relative to the housing (17) in directions which differ from a coupling direction.

9. A system in accordance with claim 1, characterized in that the coupling section (19) is formed at a region of the housing (17) spaced from the ground in the state of use and in particular at a side (21) of the housing which extends parallel to a standing surface of the housing (17).

10. A system in accordance with claim 1, characterized in that the coupling section (19) is formed at the edge region of a housing side (21) which bounds a housing opening which is present at least in the state of use.

11. A system in accordance with claim 10, characterized in that the housing opening is formed by an open side of the housing which is preferably closed when not in use.

12. A system in accordance with claim 10, characterized in that the container (11) can be connected via the housing opening to the gas pressure source, in particular via a line (23) which is accommodated when not in use together with the gas pressure source in the housing (17) and is connected to the gas pressure source.

13. A system in accordance with claim 10, characterized in that the housing opening can be closed by means of a closure cap (25), with the coupling section (19) for the container (11) being formed at a side (21) of the housing which lies opposite to the side of the housing (22) to which the closure cap (25) is hinged.

14. A system in accordance with claim 1, characterized in that the coupling section (19) has a cut-out (27) which is formed in one of the housing sides (21) and with which a coupling region of the container (11) can be brought into engagement, in particular into form-matched and/or force transmitting engagement.

15. A system in accordance with claim 14, characterized in that the cut-out (27) includes an approximately U-shaped recess in an edge zone of one of the housing sides (21).

16. A system in accordance with claim 1, characterized in that the container (11) is made approximately cylindrical or of bottle-like shape and can be coupled to the housing (17) in such a way that in the state of use the longitudinal axis of the container (11) extends at least approximately in a vertical direction.

17. A system in accordance with claim 1, characterized in that the gas inlet (13) and the outlet (15) are formed in an extraction unit (29) of the container (11) which is mounted, in particular releasably mounted at one end of the container (11) and screwed to the container (11), with the container (11) being capable of being coupled to the housing (17) via the extraction unit (29).

18. A system in accordance with claim 17, characterized in that the container (11) can be coupled to the housing (17) standing on its head in so far as the extraction unit (29) of the container (11) faces towards the ground.

19. A system in accordance with claim 1, characterized in that the container (11), in particular an extraction unit (29) of the container (11), is provided with guide and/or holding means (31) which cooperate with the coupling section (19) of the housing (17).

20. A system in accordance with claim 19, characterized in that the guide and/or holding means (31) are provided in the form of slots or grooves which cooperate with edge zones which bound a cut-out (27) for the container (11), in particular for an extraction unit (29) of the container (11), formed in one of the housing sides (21).

21. A system in accordance with claim 1, characterized in that the guide and/or holding means (31) are formed on diametrically oppositely disposed sides of a cylindrical section (30) of a container (11), in particular of an extraction unit (29) of the container (11).

22. A system in accordance with claim 1, characterized in that the container (11), in particular an extraction unit (29) of the container (11), is provided with abutments (33) via which the desired position of the container (11) coupled to the housing (17) is determined.

23. A system in accordance with claim 22, characterized in that the abutments (33) are formed as a push-on or plug-on limitation for the container (11).

24. A system in accordance with claim 23, characterized in that the side of the extraction unit (29) remote from the container (11) is formed as a standing surface.

* * * * *